United States Patent
Toyozumi et al.

(10) Patent No.: US 8,891,966 B2
(45) Date of Patent: Nov. 18, 2014

(54) OPTICAL COMMUNICATION DEVICE AND SIGNAL ADJUSTING METHOD

(75) Inventors: Tatsuya Toyozumi, Fukuoka (JP); Koji Matsunaga, Fukuoka (JP); Yasuo Tanaka, Fukuoka (JP); Hironobu Fukuura, Fukuoka (JP); Wataru Kawasaki, Kanagawa (JP); Shota Mori, Kanagawa (JP)

(73) Assignees: Fujitsu Limited, Kawasaki (JP); Fujitsu Telecom Networks Limited, Kawasaki (JP)

( * ) Notice: Subject to any disclaimer, the term of this patent is extended or adjusted under 35 U.S.C. 154(b) by 88 days.

(21) Appl. No.: 13/448,902

(22) Filed: Apr. 17, 2012

(65) Prior Publication Data

US 2012/0315039 A1    Dec. 13, 2012

(30) Foreign Application Priority Data

Jun. 13, 2011 (JP) ................. 2011-131593

(51) Int. Cl.
*H04J 14/00* (2006.01)
*H04Q 11/08* (2006.01)

(52) U.S. Cl.
CPC ....... *H04Q 11/08* (2013.01); *H04Q 2213/1301* (2013.01)
USPC ............................................. 398/53; 398/45

(58) Field of Classification Search
CPC ................. H04Q 11/0005; H04Q 2011/002; H04Q 2011/0045
USPC .................................................. 398/45, 52–54
See application file for complete search history.

(56) References Cited

U.S. PATENT DOCUMENTS

| 7,099,593 | B1 * | 8/2006 | Islam et al. .................... 398/154 |
| 2002/0191251 | A1 * | 12/2002 | Ferguson et al. ............. 359/139 |
| 2003/0161632 | A1 * | 8/2003 | Wang ............................. 398/48 |
| 2007/0166035 | A1 |  7/2007 | Aoki |
| 2007/0172236 | A1 * | 7/2007 | Nomura et al. ................ 398/45 |
| 2009/0060506 | A1 * | 3/2009 | Matsunaga et al. ............ 398/53 |
| 2012/0128352 | A1 * | 5/2012 | Kawasaki et al. .............. 398/45 |

FOREIGN PATENT DOCUMENTS

| JP | 7-321843 | 12/1995 |
| JP | 2007-189326 | 7/2007 |

* cited by examiner

*Primary Examiner* — David Payne
*Assistant Examiner* — Casey Kretzer
(74) *Attorney, Agent, or Firm* — Staas & Halsey LLP

(57) ABSTRACT

An optical packet switching device causes branching of an optical packet that is input to an optical switch and detects a synchronization pattern having a predetermined number of bits from the branched optical packet. Then, the optical packet switching device calculates a synchronization point indicating a location of the synchronization pattern with respect to a detection timing and controls, in accordance with the calculated synchronization point, a delay amount of a delay element that delays an optical packet ON signal that is output to the optical switch.

3 Claims, 10 Drawing Sheets

OPTICAL COMMUNICATION DEVICE AND SIGNAL ADJUSTING METHOD

CROSS-REFERENCE TO RELATED APPLICATION

This application is based upon and claims the benefit of priority of the prior Japanese Patent Application No. 2011-131593, filed on Jun. 13, 2011, the entire contents of which are incorporated herein by reference.

FIELD

The embodiment discussed herein is directed to an optical communication device and a signal adjusting method.

BACKGROUND

In the field of optical communication networks, it is conventional to use an optical switch to switch paths for an optical packet transmitted from a transmission source node. A synchronization process is known for synchronizing the timing at which an optical packet is transmitted between the transmission source node and the optical switch with the timing at which the optical packet is switched.

In the following, the transmission source node and the optical switch that are used in the optical packet synchronization process will be described with reference to FIG. 10. FIG. 10 is a schematic diagram illustrating a conventional transmission source device and a conventional optical switch. As illustrated in FIG. 10, a transmission source node 1 includes a dummy packet creating circuit 1a, an optical dummy packet reading transmission circuit 1b, a time lag correction circuit 1c, and a dummy packet O/E conversion circuit 1d.

The dummy packet creating circuit 1a in the transmission source node 1 creates a dummy packet. The optical dummy packet reading transmission circuit 1b reads the dummy packet from the dummy packet creating circuit 1a in accordance with an instruction from the time lag correction circuit 1c, performs E/O conversion on the read dummy packet, and transmits the converted dummy packet to an optical switch 2.

The dummy packet O/E conversion circuit 1d performs O/E conversion on the returned optical dummy packet received from the optical switch 2 and notifies the time lag correction circuit 1c of it. The time lag correction circuit 1c performs synchronization detection on the returned dummy packet. Accordingly, if the time lag correction circuit 1c detects synchronization loss, the time lag correction circuit 1c changes the read timing of the dummy packet and allows the optical dummy packet reading transmission circuit 1b to transmit optical dummy packets until synchronization has been achieved.

The optical switch 2 cuts out, at the optical switch timing, an optical dummy packet transmitted from the optical dummy packet reading transmission circuit 1b and returns the cut out optical dummy packet to the dummy packet O/E conversion circuit 1d.

In the following, the transmission of the optical dummy packet and the returned optical dummy packet will be described with reference to FIG. 11. FIG. 11 is a schematic diagram illustrating a conventional time lag correction process. As illustrated in FIG. 11, when the initialization setting is performed at the time of the booting, the transmission source node 1 adds synchronization codes to both ends of the optical dummy packet and transmits the packet to the optical switch 2. The optical switch 2 cuts out the optical dummy packet at the constant optical switch timing and returns the cut out optical dummy packet to the transmission source node 1.

FIG. 11 illustrates a case, as an example, in which the head end synchronization code in the optical dummy packet returned from the optical switch 2 is cut out. In such a case, the time lag correction circuit 1c in the transmission source node 1, not detecting the head end synchronization code, lets the optical dummy packet reading transmission circuit 1b transmit the optical dummy packet by delaying the transmission timing of the optical dummy packet. The transmission timing and the size of the optical dummy packet are set after repeatedly performing this process and when synchronization is properly detected, i.e., when both ends of the synchronization codes are detected in the optical dummy packet. Then, the transmission source node 1 performs the optical packet communication by fixing the set transmission timing and size of the optical dummy packet.

Related art is disclosed in Japanese Laid-open Patent Publication No. 07-321843.

However, with the conventional technology described above, because optical packet communication is performed at the transmission timing and is performed by using the packet size that are set at the time of initial setting, there is a problem in that the transmission rate decreases. Specifically, with the conventional technology, because the optical packet communication is performed with the fixed transmission timing, the transmission is not performed at an arbitrary timing for the transmission source. Accordingly, transmission data is piled up in the transmission source node, and the transmission rate thus decreases.

Furthermore, with the conventional technology described above, because the optical packet communication is performed using a fixed packet size, if the size of data to be packetized is less than that of one packet, in order to conform the data size to the fixed packet size, the data is packetized after invalid data is added thereto. Accordingly, if the optical packet communication is performed using the fixed packet size, the data is not packetized in an arbitrary data size. Therefore, because the optical packet communication is performed using the packet having invalid data, the transmission rate decreases.

SUMMARY

According to an aspect of an embodiment of the invention, an optical communication device includes a branch circuit that causes branching of an optical packet that is input to an optical switch; a synchronization pattern detecting circuit that detects, from the branched optical packet, a synchronization pattern having a predetermined number of bits and calculates a synchronization point indicating a location of the synchronization pattern with respect to a detection timing; and a delay control circuit that controls, in accordance with the calculated synchronization point, a delay amount of a delay circuit that delays an ON signal that is output to the optical switch.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

A preferred embodiment of the present invention will be explained with reference to accompanying drawings. The present invention is not limited to the embodiment.

In the following embodiment, the configuration of an optical packet switching device, a transmission source node, and an optical switch control circuit according to an embodiment and the flow of processing thereof are described in the order they are listed in this sentence. Finally, an advantage of the embodiment will be described.

Figure 1:
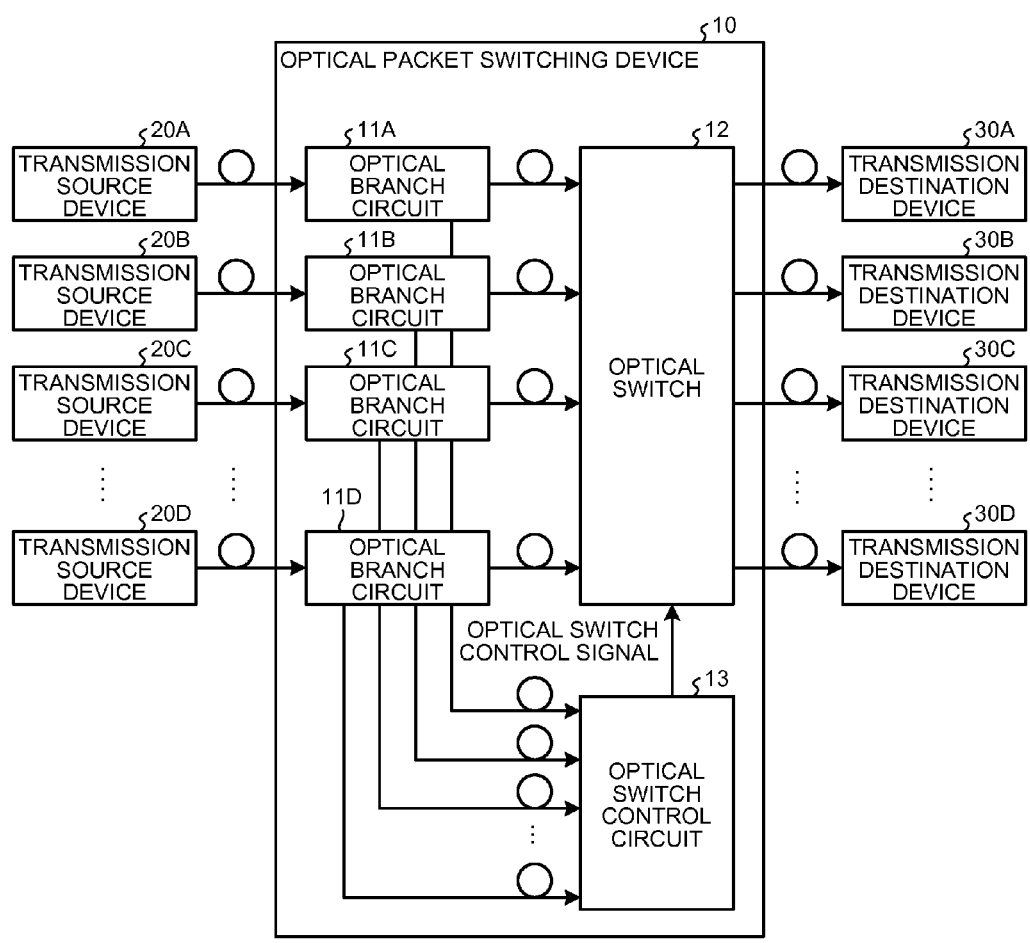
FIG. 1 is a schematic diagram illustrating the configuration of an optical packet switching device according to an embodiment.

First, the configuration of an optical packet switching device 10 will be described with reference to FIG. 1. FIG. 1 is a block diagram illustrating the configuration of the optical packet switching device 10 according to an embodiment. As illustrated in FIG. 1, the optical packet switching device 10 includes optical branch circuits 11A to 11D, an optical switch 12, and an optical switch control circuit 13. Furthermore, the optical packet switching device 10 is connected to transmission source devices 20A to 20D and transmission destination devices 30A to 30D via optical fibers. In FIG. 1, the number of optical branch circuits 11, transmission source devices 20, and transmission destination devices 30 are four; however, the number of them is not limited thereto.

The transmission source devices 20A to 20D and the transmission destination devices 30A to 30D are, for example, relay nodes that convert IP packets to optical packets and transfer the optical packets. The transmission source devices 20A to 20D are connected via optical fibers. Each of the optical packets that are output from each of the transmission source devices 20A to 20D is optically switched at the optical packet switching device 10, and is transmitted to corresponding transmission destination devices 30A to 30D.

Each of the optical branch circuits 11A to 11D causes the branching of an optical packet that is input to the optical switch 12. For example, when each of the optical branch circuits 11A to 11D receives an optical packet from each of the corresponding transmission source devices 20A to 20D, each of the optical branch circuits 11A to 11D branches the optical packet into two and outputs the branched packet to the optical switch 12 and the optical switch control circuit 13. At this time, the optical packet switching device 10 inputs each of the optical packets that is output from each corresponding optical branch circuits 11A to 11D to the optical switch 12 by delaying the transmission of the optical packets by the processing time taken by the optical switch control circuit 13. This is performed so that both the optical packets output from the optical branch circuits 11A to 11D and an optical switch control signal output from the optical switch control circuit 13 simultaneously reach the optical switch 12. In the optical packet switching device 10 according to the embodiment, an optical packet output from each of the optical branch circuits 11A to 11D is input to the optical switch 12 by a delaying of, for example, 2 clocks.

The optical switch 12 switches optical packets on a predetermined route in accordance with an optical switch control signal that is output from the optical switch control circuit 13 and outputs an optical packet to the transmission destination device 30 via a port.

The optical switch control circuit 13 determines the switch route of the optical packet from an optical packet header and creates an optical switch control signal. The optical switch control signal includes an optical switch ON signal and an optical switch OFF signal. The optical switch 12 switches optical packets and outputs an optical packet to the transmission destination device 30 while the optical switch 12 receives the optical switch ON signal that is output from the optical switch control circuit 13.

Figure 2:
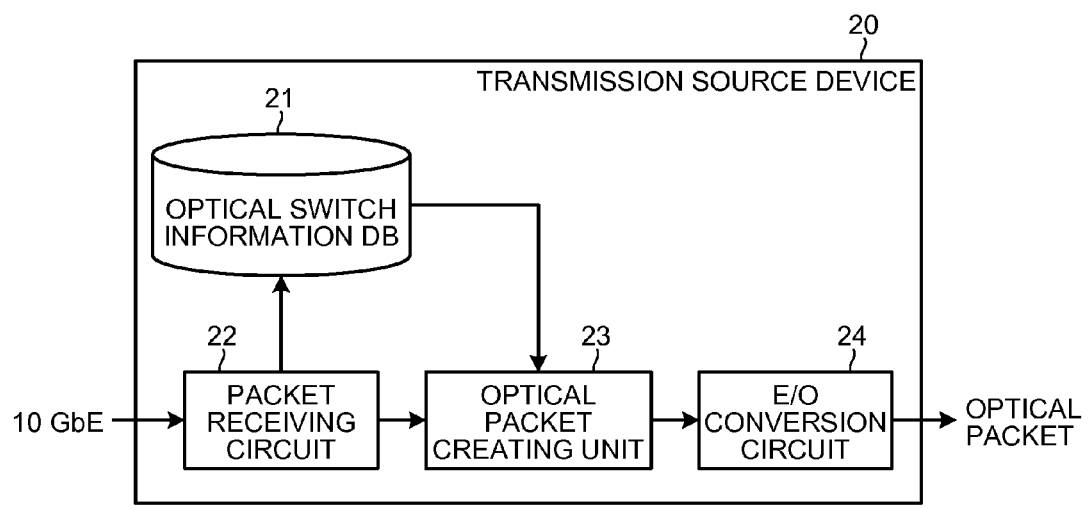
FIG. 2 is a schematic diagram illustrating the configuration of a transmission source device according to the embodiment.

The transmission source device 20 transmits the optical packet at an arbitrary transmission timing and of an arbitrary packet size. In the following, the configuration of the transmission source device 20 illustrated in FIG. 1 will be described with reference to FIG. 2. As illustrated in FIG. 2, the transmission source device 20 includes an optical switch information data base (DB) 21, a packet receiving circuit 22, an optical packet creating unit 23, and an E/O conversion circuit 24.

The optical switch information DB 21 stores therein optical switch ports by associating them with IP addresses. If a destination IP address is input from the packet receiving circuit 22, the optical switch information DB 21 outputs, to the optical packet creating unit 23, an optical switch port associated with the input destination IP address.

The packet receiving circuit 22 receives an IP packet from, for example, a 10G Ethernet (registered trademark) and detects the length of the received IP packet. Furthermore, the packet receiving circuit 22 extracts information on the destination IP address contained in the received packet. Then, the packet receiving circuit 22 outputs information on a packet length to the optical packet creating unit 23 and outputs information on a destination IP address to the optical switch information DB 21.

The optical packet creating unit 23 adds, as an optical packet header, the packet length and an optical switch port to the head of the IP packet together with a synchronization pattern. Then, the optical packet creating unit 23 outputs, to the E/O conversion circuit 24, the packet to which the synchronization pattern and the optical packet header are added.

Figure 3:
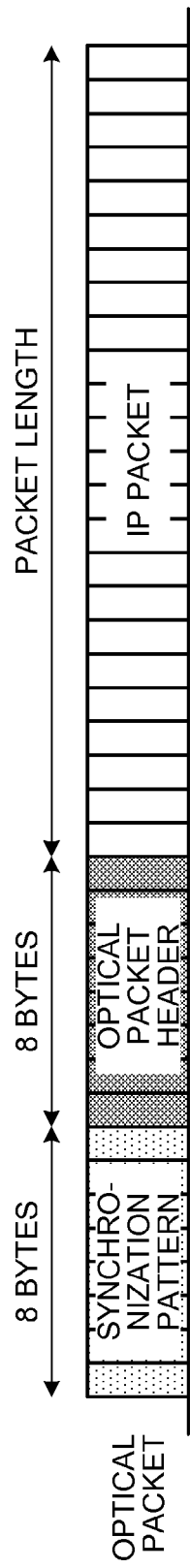
FIG. 3 is a schematic diagram illustrating the data configuration of an optical packet.

In the following, the packet created by the optical packet creating unit 23 will be described with reference to FIG. 3. FIG. 3 is a schematic diagram illustrating the data configuration of an optical packet. As illustrated in FIG. 3, the optical packet is a packet that contains therein an 8-byte synchronization pattern, an 8-byte optical packet header, and an IP packet having a predetermined size.

The synchronization pattern is data that contains therein a preamble and a synchronization code. For example, the preamble is data in which the mark rate of optical lead-in is 50%, and the synchronization code is a detection code for an optical packet. The optical packet header is data that contains therein the packet length that corresponds to the actual length of the IP packet and an optical switch port that is data in the bitmap format for identifying a port of the optical switch. For example, if the maximum transmission unit (MTU) is 9600 bytes, 14 bits are needed for the packet length. An optical packet can be switched to a plurality of ports by using an N-bitmap optical switch port.

By performing an E/O conversion, the E/O conversion circuit 24 converts the packet, to which the synchronization pattern and the optical packet header are added, to an optical packet and outputs the converted optical packet to the optical packet switching device 10 via a port.

Figure 4:
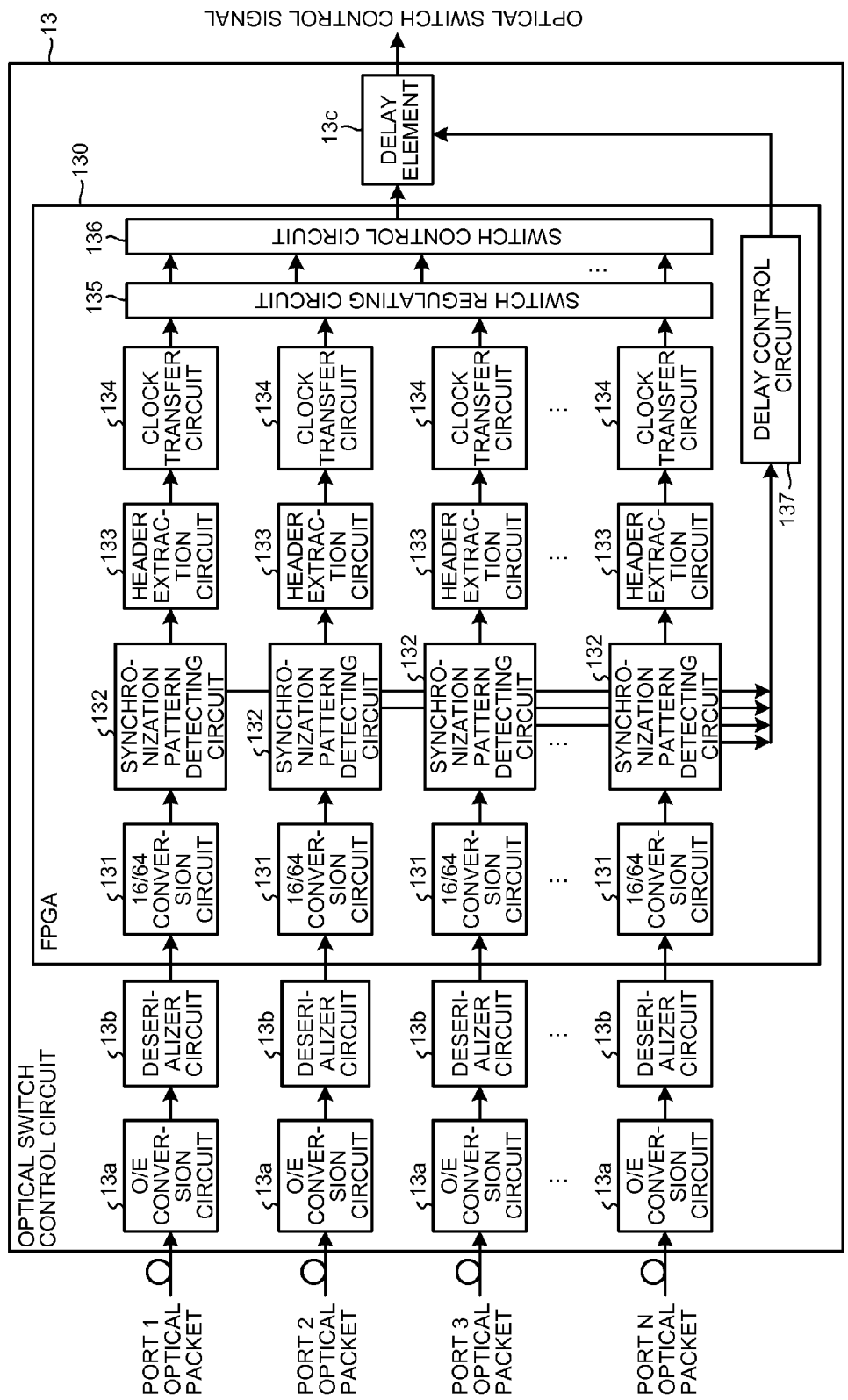
FIG. 4 is a schematic diagram illustrating the configuration of an optical switch control circuit according to the embodiment.

In the following, the optical switch control circuit 13 will be described with reference to FIG. 4. The optical switch control circuit 13 includes a plurality of O/E conversion circuits 13a, a plurality of deserializer circuit 13b, a field programmable gate array (FPGA) 130, and a delay element 13c. Each of the circuits, FPGA and element will be described below. The number of bits of data is only an example and is thus not limited thereto.

Each of the O/E conversion circuits 13a receives an optical packet output from the transmission source device 20, performs O/E conversion on the received optical packet, and creates a clock and data. Then, each of the O/E conversion circuits 13a outputs, to each of the deserializer circuits 13b, 10.3 Gbps serial data that is converted to an electrical signal.

Each of the deserializer circuits 13b converts the input 10.3 Gbps serial data to 644 MHz×16 bit parallel data. Then, each of the deserializer circuits 13b outputs the 644 MHz×16 bit parallel data to each 16/64 conversion circuit 131 in the FPGA 130.

When an optical switch ON signal is input from a switch control circuit 136 in the FPGA 130, the delay element 13c delays the optical switch ON signal and outputs the delayed signal to the optical switch 12. Specifically, the delay element 13c performs fine adjustment on the phase difference between an optical packet and an optical switch control signal such that the optical packet and the optical switch control signal simultaneously reach the optical switch 12. The delay element 13c is, for example, the 3D-3428 device manufactured by data delay devices, Inc.

The FPGA 130 is an integrated circuit and includes a plurality of 16/64 conversion circuits 131, a plurality of synchronization pattern detecting circuits 132, a plurality of header extraction circuits 133, a plurality of clock transfer circuits 134, a switch regulating circuit 135, a switch control circuit 136, and a delay control circuit 137. In the following, each circuit will be described. However, the configuration is not limited to the FPGA 130. For example, another electronic circuit, such as an application specific integrated circuit (ASIC), may also be used.

Each of the 16/64 conversion circuits 131 converts the 644 MHz×16 bit parallel data that is input from the deserializer circuit 13b to 161 MHz×64 bit data. Because the FPGA 130 does not process the 644 MHz×16 bit data, the transmission speed of the data needs to be reduced to 161 MHz. Then, each of the 16/64 conversion circuits 131 outputs the 161 MHz×64 bit data to each of the synchronization pattern detecting circuits 132.

Each of the synchronization pattern detecting circuits 132 detects a 64-bit synchronization pattern from the 161 MHz× 64 bit data that is input from each of the corresponding 16/64 conversion circuits 131 and calculates a synchronization point that indicates the location of the synchronization pattern with respect to a detection timing.

For example, each of the synchronization pattern detecting circuits 132 detects a synchronization pattern in a 161 MHz clock cycle and detects a specific 64-bit synchronization code from all of 128 bits obtained by merging 64-bit data of 161 MHz clock time T and 64-bit data of clock time T+1. Specifically, there may be a case in which a part of a received synchronization pattern is present in the 64-bit data of clock time T and the other part of the received synchronization pattern is present in the 64-bit data of clock time T+1; therefore, a specific 64-bit synchronization code is detected from among all of the merged 128 bits.

Then, each of the synchronization pattern detecting circuits 132 specifies the location of the detected 64-bit synchronization code in 64-bit data that is input in one clock cycle. Subsequently, each of the synchronization pattern detecting circuits 132 outputs, to the delay control circuit 137 in accordance with the specified location, synchronization location information indicating the location of the synchronization pattern that is present in 64 bits. As the synchronization location information, for example, the synchronization pattern detecting circuit 132 calculates the number of bits in the synchronization pattern that is received after a predetermined detection timing and outputs, to the delay control circuit 137, any one from among "0" to "63".

A specific example of the synchronization location information will be described below. For example, there may be a case in which, if the entire 64-bit synchronization code is contained in 64-bit data that is input in one clock cycle, the synchronization pattern detecting circuit 132 can detect a synchronization pattern in one clock cycle, i.e., a case in which a timing of extracting a synchronization pattern is the earliest. By using the timing of receiving the synchronization pattern in this case as a reference, the number of bits that is received after the timing of receiving the synchronization pattern is determined as a value of the synchronization location information. For example, if the entire synchronization pattern can be detected in one clock cycle described above, the synchronization pattern detecting circuit 132 outputs the synchronization location information "0" to the delay control circuit 137.

In the following, a description will be given of a calculating process of a synchronization point in a case in which not the entire 64-bit synchronization code is contained in the 64-bit data that is input in one clock, i.e., a synchronization pattern is contained in two successive 64-bit data each of which is input in one clock. In such a case, the synchronization pattern detecting circuit 132 determines the number of bits in the synchronization pattern received after the detection timing by comparing the subject synchronization pattern with a synchronization pattern that can be detected in one clock. For example, there may be a case in which a 63-bit synchronization code is contained in 64-bit data that is input in one clock and the remaining 1-bit synchronization code is contained in the subsequent 64-bit data that is subsequently input in one clock. In such a case, the number of bits in the synchronization pattern received after the detection timing is "1". Accordingly, the synchronization pattern detecting circuit 132 outputs synchronization location information of "1" to the delay control circuit 137.

Figure 5:
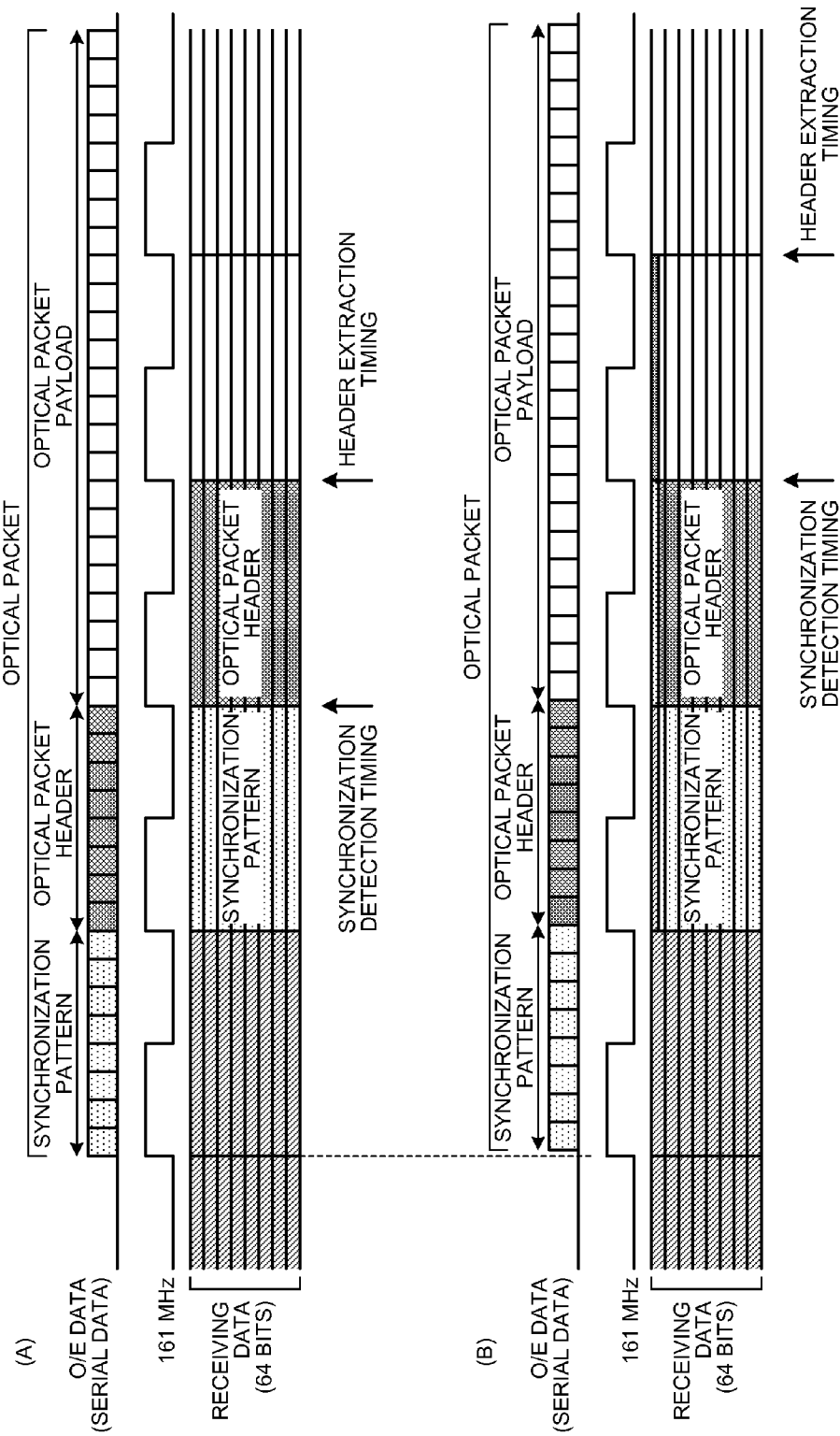
FIG. 5 is a schematic diagram illustrating the synchronization pattern detection timing and the header extraction timing.

Each of the header extraction circuits 133 extracts an optical packet header in accordance with the synchronization pattern detection result. In the following, the synchronization pattern detection timing and the header extraction timing will be described with reference to an example illustrated in FIG. 5. FIG. 5 is a schematic diagram illustrating the synchronization pattern detection timing and the header extraction timing. In FIG. 5, the "synchronization detection timing" indicates the timing at which the synchronization pattern detecting circuit 132 detects a synchronization pattern and the "header extraction timing" indicates the timing at which the header extraction circuit 133, which will be described later, extracts an optical packet header. Furthermore, FIG. 5 illustrates two patterns, i.e., case A and case B with different "synchronization detection timings" and different "header extraction timings".

Furthermore, as illustrated in FIG. 5, a synchronization pattern, an optical packet header, and an optical packet payload are contained in an optical packet that is O/E data (serial data), converted to electrical. Furthermore, in FIG. 5, the synchronization pattern detecting circuit 132 performs a detecting process in a "161-MHz" clock cycle. Furthermore, "receiving data (64 bits)" illustrated in FIG. 5 indicates 64-bit data that is converted to parallel data from the O/E data (serial data).

Furthermore, as illustrated in the case B of FIG. 5, 1-bit O/E data is received late when compared with the case A. Specifically, in the case B, the synchronization pattern is received in two successive 64-bit data. Then, the synchronization detection timing and the header extraction timing will be described by comparing the cases A and B illustrated in FIG. 5. When compared with the case A, the case B indicates that the synchronization detection timing and the header extraction timing is delayed by 161 MHz×1 clock. A description will be given later with reference to FIGS. 6 and 7 by using, similar to the above, two patterns, such as case A and case B.

Referring back to FIG. 4, each of the clock transfer circuits 134 transfers an optical packet header extracted by each of the corresponding header extraction circuits 133 to a local clock for controlling an optical switch. The switch regulating circuit 135 regulates an optical packet at each port and determines an optical packet to switch. The switch control circuit 136 creates an optical switch ON/OFF signal in accordance with the switch regulating result and outputs it to the delay element 13c. Furthermore, the switch control circuit 136 outputs, to the delay element 13c, the optical switch ON signal by the time period according to the packet length on the basis of the packet length that is detected from the optical packet.

The delay control circuit 137 controls, on the basis of the synchronization location information that is input from the synchronization pattern detecting circuit 132, the delay amount of the delay element 13c that delays the optical switch ON signal output to the optical switch 12. For example, if a value of the synchronization location information is "1", the delay control circuit 137 reduces the delay amount of the delay element 13c such that the optical switch ON signal moves forward by 63 bits equivalent and thus a delay control level with respect to the delay amount is determined to be "63". Furthermore, if a value of the synchronization location information is "10", the delay control circuit 137 reduces the delay amount of the delay element 13c such that the optical switch ON signal moves forward by 54 bits equivalent and thus a delay control level with respect to the delay amount is determined to be "54".

Furthermore, if a value of the synchronization location information is "0", the delay amount of the optical switch ON signal does not need to be adjusted; therefore, a delay control level with respect to the delay amount is also determined to be "0".

An example method for calculating such a delay control level is: determine whether a value of the synchronization location information is equal to or greater than "1"; if the value of the synchronization location information is equal to or greater than "1", a delay control level is obtained by subtracting a value of the synchronization location information from 64. Furthermore, if the value of the synchronization location information is "0", the delay control level is set to "0".

Figure 6:
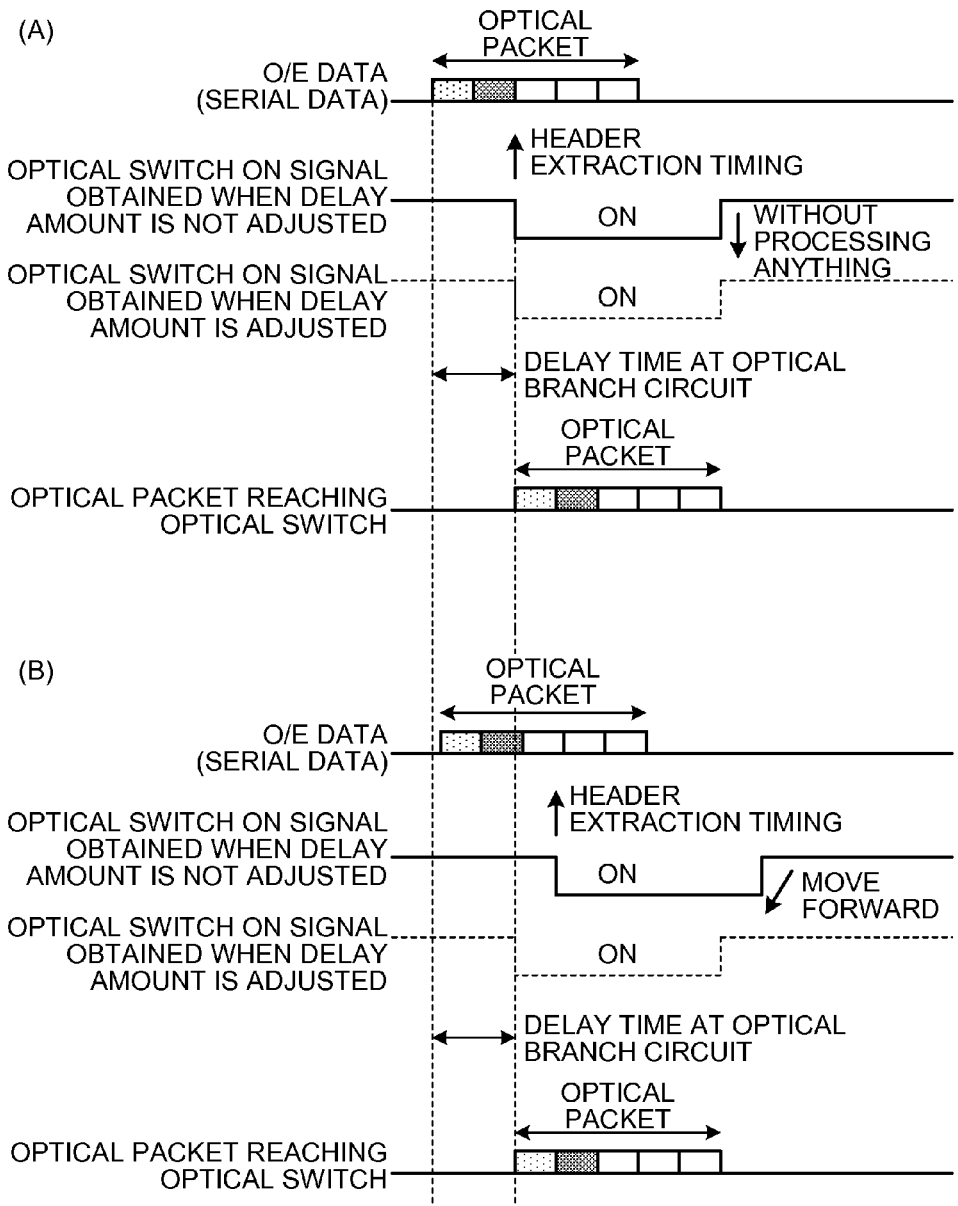
FIG. 6 is a schematic diagram illustrating a delay control process for delaying an optical switch ON signal.

In the following, the delay control process will be described with reference to an example illustrated in FIG. 6. FIG. 6 is a schematic diagram illustrating a delay control process for delaying an optical switch ON signal. In the example case A illustrated in FIG. 6, the header extraction timing, which is the timing at which an optical packet header contained in an optical packet corresponding to O/E data (serial data) is extracted, is the earliest. That is, the entire optical packet header is included in the 64-bit data that is input in one clock (hereinafter, referred to as "case A").

In the example case B illustrated in FIG. 6, when compared with the case A, the header extraction timing at which an optical packet header is extracted is delayed by one clock. That is, the entire optical packet header is not included in 64-bit data received by the header extraction circuit 133 in one clock. When compared with the case A, the header extraction timing is delayed by one clock (hereinafter, referred to as "case B").

In the case A, as can be seen from the comparison between an "optical switch ON signal obtained when delay amount is not adjusted" and an "optical switch ON signal obtained when delay amount is adjusted" illustrated in the case A of FIG. 6, the delay control circuit 137 does not control the delay amount of the optical switch ON signal. Specifically, as in the case A, if the entire optical packet header is contained in the 64-bit data that are input in one clock, the delay control circuit 137 receives "0" as the synchronization location information, from the synchronization pattern detecting circuit 132. Then, if the synchronization location information is "0", the delay control circuit 137 sets the delay control level with respect to the delay amount to "0".

In contrast, in the case B, as can be seen from the comparison between an "optical switch ON signal obtained when delay amount is not adjusted" and an "optical switch ON signal obtained when delay amount is adjusted" illustrated in the case B of FIG. 6, the delay control circuit 137 controls the delay amount of the optical switch ON signal. For example, as in the case B, it is assumed that the entire optical packet header is not contained in the 64-bit data that is input in one clock and assumed that an optical packet header having 63 bits out of 64 bits is contained in the 64-bit data. In such a case, the delay control circuit 137 receives "1" as the synchronization location information from the synchronization pattern detecting circuit 132. Then, the delay control circuit 137 sets the delay control level with respect to the delay amount to "63" in order to reduce the delay amount of the delay element 13c such that the optical switch ON signal is ahead of the header extraction timing by 63 bits equivalent.

By controlling the delay element 13c in accordance with the delay control level, the delay control circuit 137 performs a delay control on an optical switch ON signal whose length corresponds to five clocks that conform to the length of an optical packet output from the switch control circuit 136. Accordingly, the optical switch 12 is not turned on for an extra time, thus preventing a decrease in transmission rate.

As described above, in both the cases A and B, because the timing of the "optical switch ON signal obtained when delay amount is adjusted" and the timing of the "optical packet that reaches the optical switch" correspond, the optical switch 12 is not turned on for an extra time. Accordingly, the performance of the optical packet switching device 10 can be improved without reducing the transmission rate of optical packets.

Figure 7:
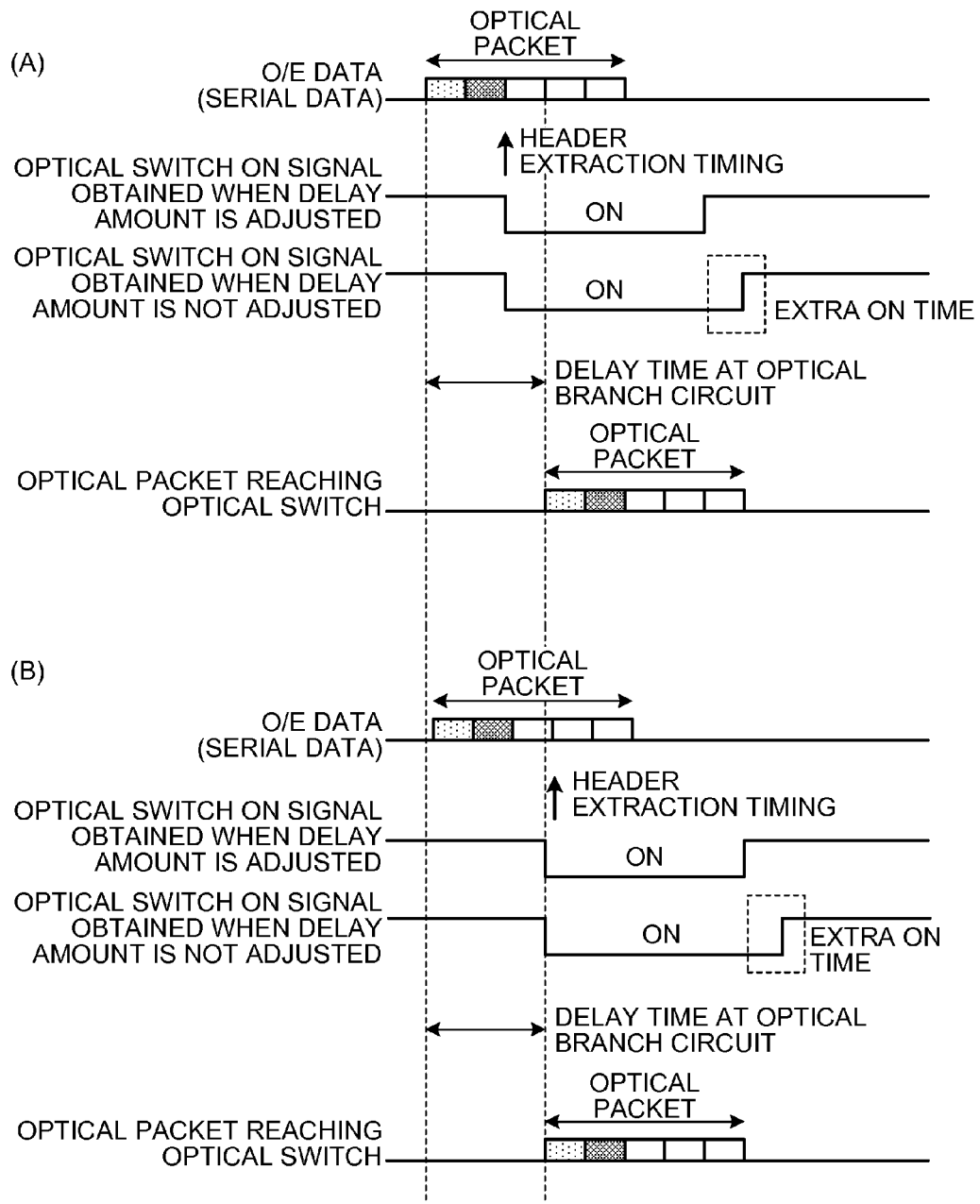
FIG. 7 is a schematic diagram illustrating the optical switch ON signal obtained when the delay control process is not performed.
Figure 8:
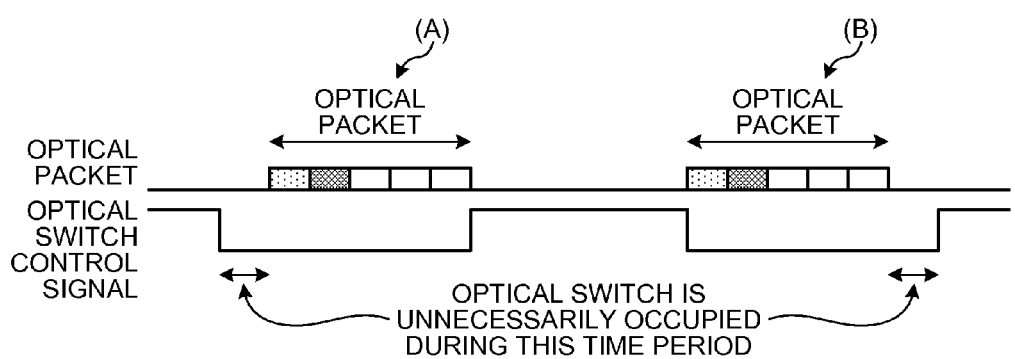
FIG. 8 is a schematic diagram illustrating the optical switch ON signal obtained when the delay control process is not performed.

In the following, to clarify an advantage provided by the optical packet switching device 10 according to the embodiment in that a decrease in transmission rate is prevented by adjusting the delay amount, an optical switch ON signal, which is obtained when the delay control process is not performed, will be described with reference to FIGS. 7 and 8. FIGS. 7 and 8 are schematic diagrams each illustrating the optical switch ON signal obtained when the delay control process is not performed. In the example illustrated in FIG. 7, because the delay amount is fixed regardless of the delay control process, an output time period of the optical switch ON signal is set to a time period corresponding to six clocks. Specifically, even if the timing at which an optical packet header is extracted is delayed by one clock, the output time period of the optical switch ON signal is set longer in order to reliably output, to the optical switch 12, the optical switch ON signal in a time period during which the optical packet is present in the optical switch 12.

In the example illustrated in FIG. 7, so that the optical switch ON signal is output to the optical switch 12 in the time period during which the optical packet is present, even if the timing at which the optical packet header is extracted is delayed by one clock, the optical branch circuit 11 outputs, to the optical switch 12, the optical packet by delaying the optical packet by three clocks.

For example, in the cases A and B illustrated in FIG. 7, the optical switch ON signal obtained when the delay amount is adjusted from the header extraction timing is output by the length corresponding to five clocks that conform to the packet length. In contrast, the optical switch ON signal obtained when the delay amount is not adjusted from the header extraction timing is output by the length corresponding to six clocks whose length is longer than the packet length. Accordingly, as illustrated in the cases A and B of FIG. 8, if the delay amount is not adjusted, even in a time period during which the optical packet is not present in the optical switch 12, the optical switch is unnecessarily occupied, thus reducing the transmission rate of optical packets and accordingly decreasing the performance of the optical packet switching device 10.

Figure 9:
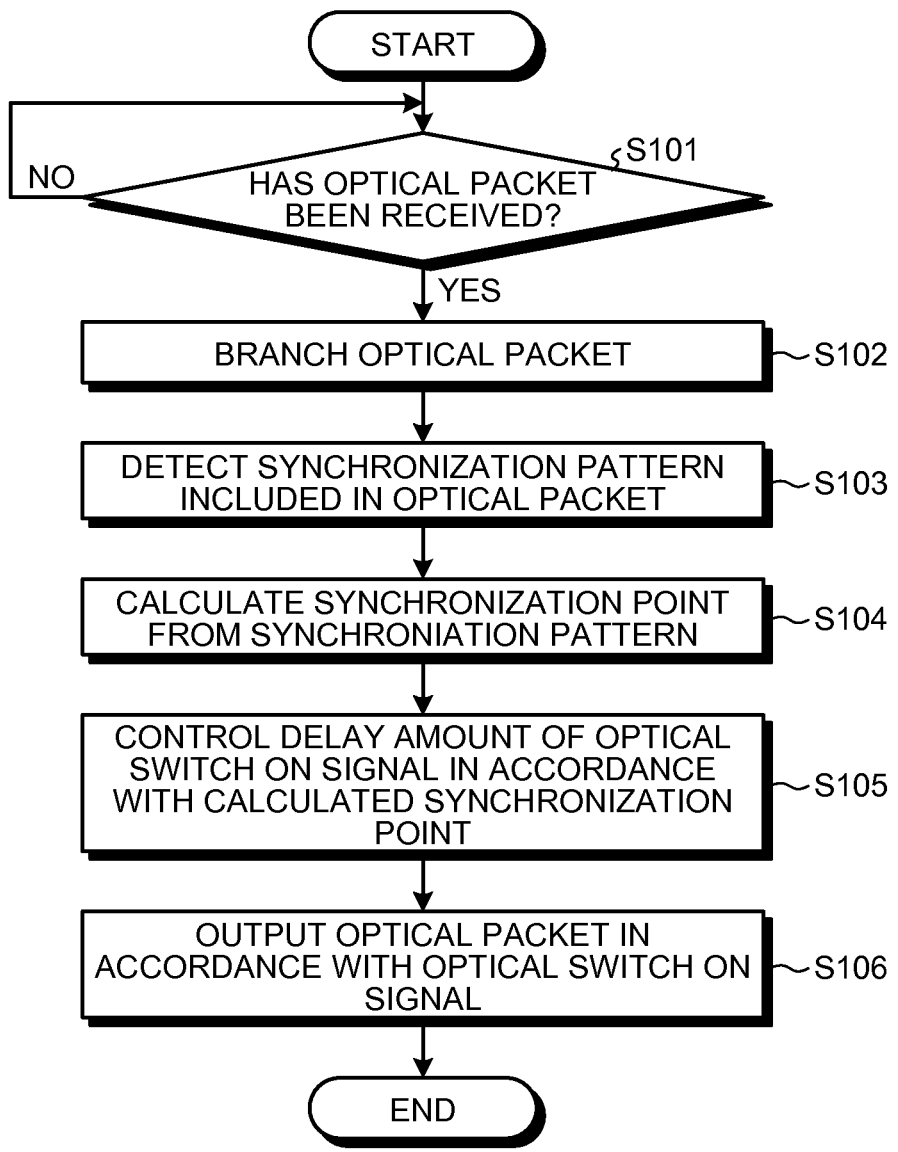
FIG. 9 is a flowchart illustrating the flow of a process performed by the optical packet switching device according to the embodiment.
Figure 10:
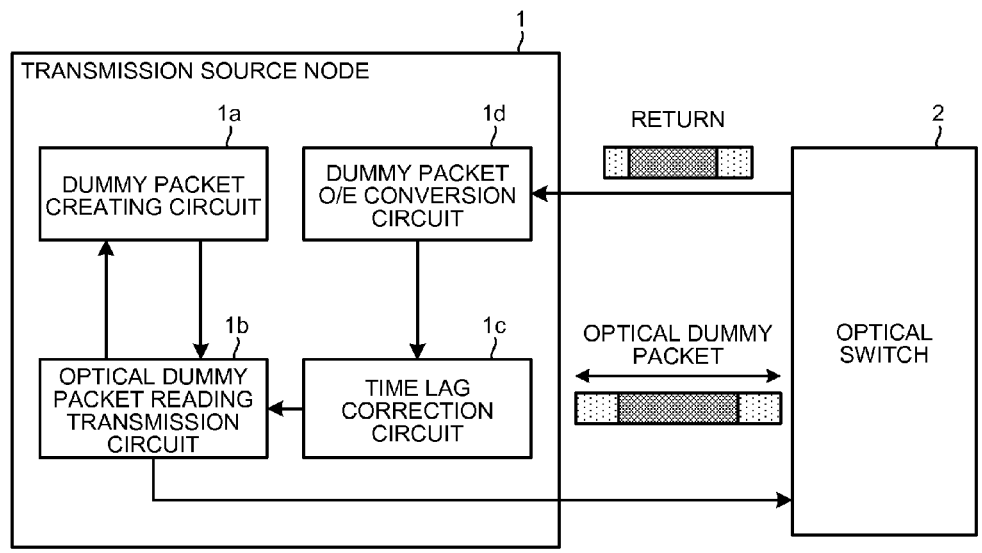
FIG. 10 is a schematic diagram illustrating a conventional transmission source device and a conventional optical switch.
Figure 11:
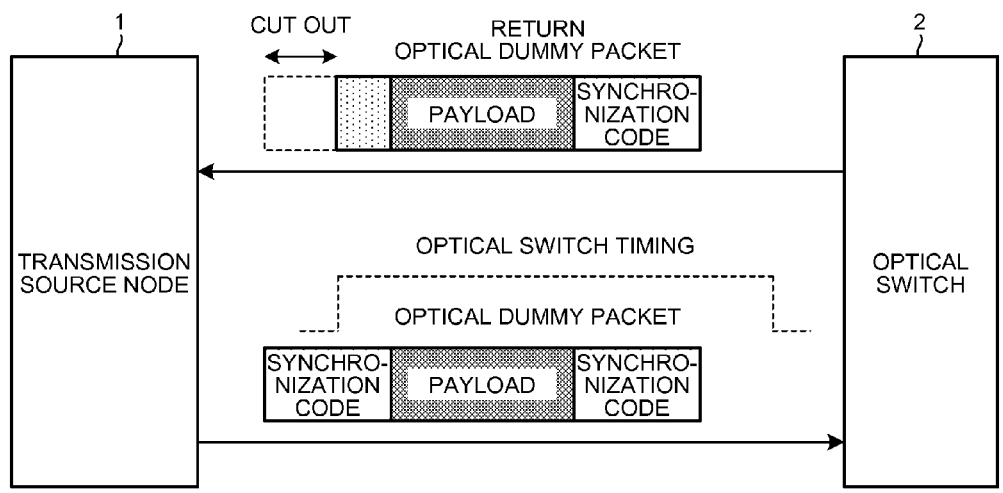
FIG. 11 is a schematic diagram illustrating a conventional time lag correction process.

In the following, a process performed by the optical packet switching device 10 according to the embodiment will be described with reference to FIG. 9. FIG. 9 is a flowchart illustrating the flow of a process performed by the optical packet switching device 10 according to the embodiment.

As illustrated in FIG. 9, if each of the optical branch circuits 11 in the optical packet switching device 10 receives an optical packet from each of the corresponding transmission source devices 20A to 20D (Yes at Step S101), each of the optical branch circuits 11 branches the optical packet into two and outputs the branched optical packets to the optical switch 12 and the optical switch control circuit 13 respectively (Step S102).

Then, each of the synchronization pattern detecting circuits 132 in the optical switch control circuit 13 detects a 64-bit synchronization pattern contained in the optical packet (Step S103) and calculates a synchronization point that indicates the location of the synchronization pattern with respect to the detection timing (Step S104). For example, each of the synchronization pattern detecting circuits 132 calculates the number of bits that are late received after the synchronization pattern with respect to the timing at which the synchronization pattern is detected.

Then, the delay control circuit 137 controls the delay amount of the optical switch ON signal in accordance with the calculated synchronization point (Step S105). For example, if a value of the synchronization location information is "1", so that the delay control circuit 137 reduces the delay amount of the delay element 13c such that the optical switch ON signal is ahead by 63 bits equivalent, the delay control circuit 137 sets the delay control level with respect to the delay amount to "63". Thereafter, the optical switch 12 outputs the optical packet in accordance with the optical switch ON signal received from the delay element 13c (Step S106).

As described above, the optical packet switching device 10 causes the branching of the optical packet that is input to the optical switch 12 and detects, from the branched optical packet, a synchronization pattern having a predetermined number of bits. Then, the optical packet switching device 10 calculates a synchronization point indicating the location of the synchronization pattern with respect to the detection timing and controls, in accordance with the calculated synchronization point, the delay amount of the delay element 13c that delays an optical packet ON signal that is output to the optical switch 12. Accordingly, it is possible to prevent a decrease in transmission rate of optical packets from decreasing.

Furthermore, according to the embodiment, the optical packet switching device 10 calculates the number of bits in the synchronization pattern received after a predetermined detection timing. Then, the optical packet switching device 10 controls a delay circuit that delays an ON signal by a predetermined delay amount in accordance with the predetermined detection timing, such that the predetermined delay amount is reduced in accordance with the number of bits. Accordingly, it is possible to further accurately control the delay amount.

Furthermore, according to the embodiment, the optical packet switching device 10 controls, in accordance with the packet length detected from the branched optical packet, the delay circuit such that the ON signal is output to the optical switch 12 during a time period corresponding to the packet length. Accordingly, it is possible to prevent the optical switch 12 from being occupied for an extra time and to prevent a decrease in transmission rate of optical packets.

Furthermore, in the embodiment, a case has been described in which the transmission source device performs optical packet communication using an arbitrary packet size and an arbitrary transmission timing; however, the present invention is not limited thereto. For example, the transmission source device may also transmit an optical packet with a fixed packet size at an arbitrary transmission timing. In such a case, the optical switch control circuit 13 controls the delay element 13c such that the delay element 13c outputs the optical switch ON signal to the optical switch 12 during a time period corresponding to the fixed packet length.

Furthermore, the components of each circuit or unit illustrated in the drawings are only for conceptually illustrating the functions thereof and are not always physically configured as illustrated in the drawings. In other words, the specific shape of a separate or integrated circuit is not limited to the drawings; however, all or part of the circuit can be configured by functionally or physically separating or integrating any of the circuits depending on various loads or use conditions. For example, the synchronization pattern detecting circuit 132 may be integrated with the delay control circuit 137.

According to an aspect of the present invention, the optical communication device disclosed in the present invention can prevent a decrease in transmission rate.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical communication device comprising:
    a branch circuit that causes branching of an optical packet that is input to an optical switch;
    a synchronization pattern detecting circuit that detects, from the branched optical packet, a synchronization pattern having a predetermined number of bits and calculates a number of bits in the synchronization pattern that are received after a predetermined detection timing; and
    a delay control circuit that controls a delay circuit that outputs an ON signal to the optical switch, when the synchronization pattern detecting circuit detects the synchronization pattern after the predetermined detection timing, by reducing a predetermined delay amount of the delay circuit in accordance with the number of bits calculated by the synchronization pattern detecting circuit.

2. The optical communication device according to claim 1, wherein the delay control circuit further controls the delay circuit such that the delay circuit outputs, in accordance with a packet length detected from the branched optical packet, the ON signal to the optical switch during a time period corresponding to the packet length.

3. A signal adjusting method for adjusting a transmission timing of an ON signal that is output to an optical switch, the signal adjusting method comprising:
    dividing into branches an optical packet that is input to the optical switch;
    detecting, from the branched optical packet, a synchronization pattern having a predetermined number of bits and calculating a number of bits in the synchronization pattern that are received after a predetermined detection timing; and
    controlling a delay circuit that outputs the ON signal, when the synchronization pattern is detected after the predetermined detection timing, by reducing a predetermined delay amount of the delay circuit in accordance with the calculated number of bits.

* * * * *